United States Patent [19]
Deutscher et al.

[11] 3,735,443
[45] May 29, 1973

[54] WINDSHIELD WIPER BLADE CONSTRUCTION

[75] Inventors: Hans-Christian Deutscher, Ludwigsburg; Kurt Bauer, Kleiningersheim, both of Germany

[73] Assignee: SWF Spezialfabrik Fuer Autozubehoer Gustav Rau GmbH, Bietigheim, Germany

[22] Filed: Sept. 3, 1971

[21] Appl. No.: 177,707

[30] Foreign Application Priority Data

Nov. 27, 1970 Germany................P 20 58 389.5

[52] U.S. Cl............................15/250.36, 15/250.42
[51] Int. Cl..............................................B60s 1/38
[58] Field of Search...................15/250.36, 250.42, 15/250.38

[56] References Cited

UNITED STATES PATENTS

| 2,659,097 | 11/1953 | Morton | 15/250.36 X |
| 2,925,615 | 2/1960 | Krohm | 15/250.42 |
| 3,076,993 | 2/1963 | Anderson | 15/250.42 |

FOREIGN PATENTS OR APPLICATIONS

| 820,156 | 7/1937 | France | 15/250.06 |

Primary Examiner—Peter Feldman
Attorney—John J. McGlew and Alfred E. Page

[57] ABSTRACT

A windshield wiper blade comprises a blade wiping band and includes an upper portion with a plurality of longitudinally spaced transversely extending grooves into which are placed spring elements. The spring elements are designed as flat wire springs bent undularly parallel to the wiping field.

7 Claims, 3 Drawing Figures

PATENTED MAY 29 1973 3,735,443

Inventors
HANS-CHRISTIAN DEUTSCHER
KURT BAUER

BY John J. McGlew
ATTORNEY

WINDSHIELD WIPER BLADE CONSTRUCTION

BACKGROUND OF THE INVENTION

1. Field of the Invention

This invention relates in general to the construction of wiper blades and in particular to a new and useful wiper blade for a windshield wiper assembly for vehicles such as motor vehicles, which comprises a wiping band with spring slides inserted into longitudinal grooves and which include longitudinally spaced claw stirrups which embrace the slides and lock them in position.

2. Description of the Prior Art

Windshield wiper assemblies are known, particularly searchlight windshield wipers, which require a wiping element that can be deflected to a varying degree in the wiping field plane. With such a construction the driven wiper blade includes a supporting element therein which comprises a coil spring on which are secured a wiping band or brush. Such a wiping element can be deflected in all directions. There is therefore the possibility that the wiping element will not always bear with the necessary pressure on the windshield during the wiping movement over a highly curved, for example, calotte-shaped windshield. This is because the coil spring of the wiping element adjusts itself into a position determined by the least resistance. The result is that the wiping element can even detach itself from the windshield and this leads to an insufficient wiping pattern.

SUMMARY OF THE INVENTION

In accordance with the present invention there is provided a wiper blade for windshield wiper assemblies which permits, in addition to deflection, perpendicularly to the wiping field, a varying deflection in the plane of the wiping field. The windshield wiper will still exert a sufficient contact pressure on the windshield during a wiping movement even over highly curved windshields. The wiping blade for the windshield wiper assemblies comprises a wiping band with spring slides which are inserted into longitudinal grooves and which includes claw elements arranged at one or more locations along the longitudinal length which embrace and lock the slides to the wiping band. The spring slides are formed as flat wire springs which are bent in wave form parallel to the wiping field. The wiper blade mobility in the plane of the wiping field is achieved by the design of the spring slides alone with additional degrees of freedom being possible. Since the spring slides can still move parallel to the wiping field the wiping operation over highly curved windshields is not affected. The mobility of the spring slides in the plane of the wiping field permits the guidance of the wiper blade without the wiper blade being capable of detaching itself from the windshield.

The springs for the wiper blade are advantageously bent from spring steel wire having a round cross section. The locking of the wire springs on the wiper band without impairing the axial adjustability of the supporting claws or stirrups is achieved by forming cross grooves along the length of the wiping band which are of a depth which corresponds to the width of the wave-shaped formation of the spring. One or more of the springs may be arranged or imbedded directly into the wiper band assembly.

A varying deflection of the wiper blade can also be achieved by providing the wiper blade with at least two claw stirrups with individual fulcrums for separate wiper arms. This makes it possible to guide the wiper blade in the range of the fulcrums while it is being imparted with a varying drive by the driving wiper arm. In the preferred construction one of the claw stirrups is locked axially immovably on the wiping band, while the other claw stirrups are axially adjustable. The axially immovable claw stirrups is locked on at least one end in a receiver of the wiping band.

Accordingly it is an object of the invention to provide a wiper blade which includes a band having a plurality of spring slide members in the form of a wire spring bent into wave form extending substantially parallel to the wiping field.

A further object of the invention is to provide a wiper blade construction which includes a blade member having an upper end with a plurality of transversely longitudinally spaced grooves into which are inserted wave portions of a continuous spring member and which includes a suspension claw engaging the wiper at two longitudinally spaced locations and locking the spring member into position.

A further object of the invention is to provide a wiper blade construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
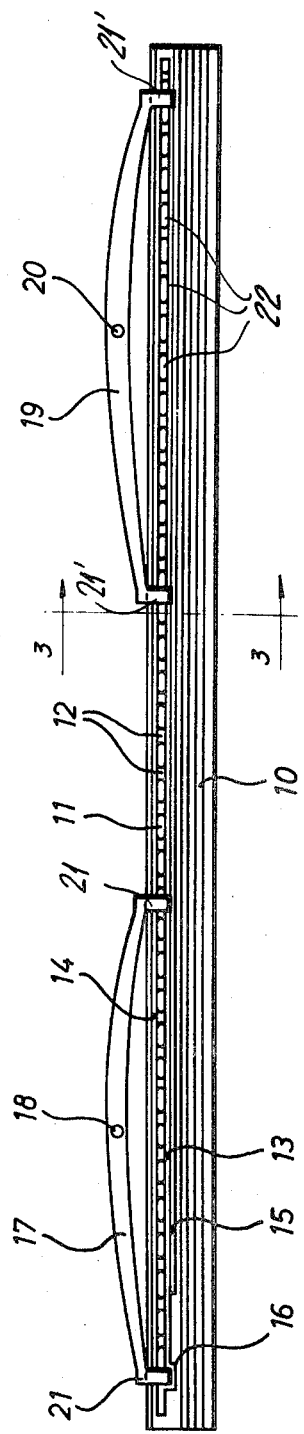
FIG. 1 is a slide elevation view of a wiper blade constructed in accordance with the invention.
Figure 2:
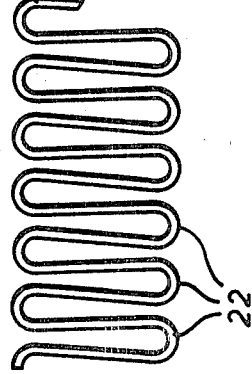
FIG. 2 is a partial top plan view of a wiper blade spring for the band indicated in FIG. 1; and, FIG. 3, is an enlarged section taken on the line 3—3 of FIG. 1.
Figure 3:
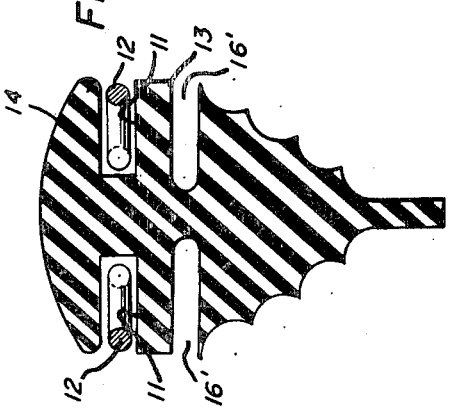

Referring to the drawings in particular the invention embodied therein in FIGS. 1, 2 and 3 comprises a wiper blade or band 10 preferably made of a resilient material such as rubber.

In accordance with the invention the blade 10 includes an upper or outer portion having a longitudinally extending groove 11 defined in a side face into which is fitted a wave-shaped or undularly bent wire spring 12. The spring is bent in the plane of the wiping fields as shown in the individual wave formations 22 of the wire 23 indicated in FIG. 2. The width of the bent wire spring is adapted to the depth of the longitudinal groove 11. The blade 10 includes two vertically spaced webs 13 and 14 which define a groove 11 therebetween on each side of the blade.

The wiper blade 10 is provided with additional longitudinally elongated recess or grooves 15,15 as shown in FIGS. 1 and 3 to accommodate claws 21', 21' and one of the claws 21 of the respective claw stirrups 19 and 17. Each stirrup 17 and 19 includes a claw at each end which includes a central portion which overlays the blade body at the edge opposite to the wiping field engagement edge and with a leg portion extending downwardly on each respective side of the blade body with inturned ends which engage into a respective transversely extending claw engagement groove 16', 16'. The grooves 16' are longitudinally elongated so that the stirrup 19 may be adjustably positioned along the length of the body. However the stirrup 17 is anchored at one end by engagement of the end into a receiving groove 16 as shown in FIG. 1 which has only limited longitudinal elongation. The opposite claw stirrup 21 is not locked nor is either of the claw stirrups 21' of the stirrup 19, so that stirrup 19 is displaceable on the wiper band. The stirrups 17 and 19 include fulcrums 18 and 20 which provide connecting points for separate wiper arms which are controlled differently. The range of movement of the wiper blade is such that there is deflection in a different manner along the wiper field plane. The individual waves of the wire springs 12 adapt to the new form of wiper blade by moving closer together or further apart during the movement. Since the wire springs 12 are flat they can also adjust themselves in a plane perpendicularly to the wiping field. A deflection of the wiper blade into another direction is prevented by the wire springs 12 since they offer a great resistance to the deflection. This limitation of freedom of movement of the wiping blade in a plane perpendicular to the wiping field and in a plane parallel to the wiping field ensures that the wiper balde will bear correctly on the windshield under sufficient contact pressure when it is moved in a wipping movement over a calotte-shaped windshield.

The wire springs 12 may be inserted into a similar groove 11 on each side of the blade and can be made of one piece so that they extend from one end to the other on each side of the blade.

While a specific embodiment of the invention has been sown and described in detail to illustrate the application of the principles of the invention, it will be understood that the invention may be embodied otherwise without departing from such principles.

What is claimed is:

1. A wiper blade construction comprising a wiper blade body having a side with a longitudinally extending groove defined therein and having at least one wire spring arranged in the groove with a plurality of wave formations extending parallel to the wiping field.

2. A wiper blade according to claim 1, in which said wire springs are formed from spring steel wire and have a round cross section.

3. A wiper blade according to claim 1, wherein said blade includes a pair of spaced longitudinally extending parallel webs extending along the length thereof forming said longitudinally extending groove in said blade therebetween the groove being of a depth corresponding to the width of said wire springs.

4. A wiper blade according to claim 1, including a plurality of stirrups having claws at each end connected to said wiper blade, each stirrup defining an individual fulcrum for a separate wiper arm.

5. A wiper blade according to claim 1, wherein said blade has a longitudinal groove on each side and a single piece wire spring extending along the length of each groove on each side.

6. A wiper blade according to claim 1, wherein there are a plurality of springs located along the length of said blade in said groove.

7. A wiper blade construction adapted to sweep over a wiping field, comprising a blade body of resilient material having a wiping field engagement edge and a side wall on each side with at least one of said side walls having a transversely extending groove therein, at least one continuous wire of sinuous form with wave formations disposed substantially parallel to the wiping field, said blade body having at least one claw engagement groove extending longitudinally along each side wall, and at least one stirrup having having an engagement claw at each end with a leg portion extending over each side of said body having an inturned end engaged in a respective one of said claw engagement grooves.

* * * * *